United States Patent
Adema et al.

(10) Patent No.: US 12,248,151 B1
(45) Date of Patent: Mar. 11, 2025

(54) EXTENDED REALITY PROJECTION USING MONOCHROME PIXEL PANELS IN INVERTED ARRANGEMENTS

(71) Applicant: Google LLC, Mountain View, CA (US)

(72) Inventors: Daniel Adema, Kitchener (CA); Shreyas Potnis, Kitchener (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/538,823

(22) Filed: Dec. 13, 2023

(51) Int. Cl.
*G02B 27/01* (2006.01)

(52) U.S. Cl.
CPC .. *G02B 27/0172* (2013.01); *G02B 2027/0112* (2013.01); *G02B 2027/0118* (2013.01); *G02B 2027/0134* (2013.01); *G02B 2027/0178* (2013.01)

(58) Field of Classification Search
CPC ........ G02B 27/0172; G02B 2027/0112; G02B 2027/0118; G02B 2027/0134; G02B 2027/0178
See application file for complete search history.

(56) References Cited

U.S. PATENT DOCUMENTS

| | | | | |
|---|---|---|---|---|
| 8,487,835 B2* | 7/2013 | Jung | .................... | G09G 3/3426 345/5 |
| 9,978,319 B2* | 5/2018 | Furumoto | ............. | G02F 1/1347 |
| 11,624,921 B2* | 4/2023 | Eash | ................... | G02B 27/0172 345/8 |
| 11,688,333 B1* | 6/2023 | Boecker | ................... | G09G 3/32 345/691 |
| 11,741,863 B2* | 8/2023 | Martin | ............... | G02B 27/0176 345/7 |

(Continued)

FOREIGN PATENT DOCUMENTS

CN     111323936 B     3/2022

OTHER PUBLICATIONS

"Colorchip Introduces an Ultra-Compact RGB Pico-Projector for Smartglasses Applications Based on Its Proprietary Colormux Systemonglass PLC Platform", ColorChip Ltd., https://www.prnewswire.com/il/news-releases/colorchip-introduces-an-ultra-compact-rgb-pico-projector-for-smartglasses-applications-based-on-its-proprietary-colormux-systemonglass-plcplatform-300912745.html, Sep. 5, 2019, 4 pages.

*Primary Examiner* — William Lu
(74) *Attorney, Agent, or Firm* — Brake Hughes Bellermann LLP

(57) ABSTRACT

Illustrative systems and methods for performing extended reality projection using monochrome pixel panels in inverted arrangements are described herein. For example, an extended reality projection system may include a binocular head-mounted display having a left side and a right side, a first set of monochrome pixel panels distributed in a first arrangement and collectively configured to produce a color image for presentation on the left side, and a second set of monochrome pixel panels distributed in a second arrangement and collectively configured to produce the color image for presentation on the right side. In this extended reality projection system, the second arrangement may be inverted from the first arrangement such that a color non-uniformity associated with the presentation on the right side is inverted from a color non-uniformity associated with the presentation on the left side. Corresponding methods and systems are also disclosed.

20 Claims, 10 Drawing Sheets

(56) References Cited

U.S. PATENT DOCUMENTS

| | | | |
|---|---|---|---|
| 2012/0287143 A1* | 11/2012 | Brown Elliott | G09G 3/3413 |
| | | | 345/589 |
| 2013/0342590 A1* | 12/2013 | Lee | H04N 13/302 |
| | | | 345/204 |
| 2016/0247441 A1* | 8/2016 | Matsueda | G09G 3/2003 |
| 2018/0146148 A1* | 5/2018 | Kaneko | H04N 25/585 |
| 2018/0218642 A1 | 8/2018 | Shamim et al. | |
| 2020/0018968 A1 | 1/2020 | Edwin et al. | |
| 2020/0267359 A1* | 8/2020 | Seiler | H04N 9/3185 |
| 2020/0271932 A1* | 8/2020 | Tuomisto | G02B 27/0944 |
| 2020/0396439 A1* | 12/2020 | Stafford | G09G 3/3208 |
| 2022/0299772 A1* | 9/2022 | Mills | G02B 27/0081 |
| 2022/0382086 A1* | 12/2022 | Honda | G02F 1/13306 |
| 2023/0130445 A1* | 4/2023 | Tan | H01L 33/24 |
| | | | 257/13 |
| 2023/0179753 A1 | 6/2023 | Leighton | |
| 2024/0265845 A1* | 8/2024 | Lin | G09G 3/2096 |

* cited by examiner

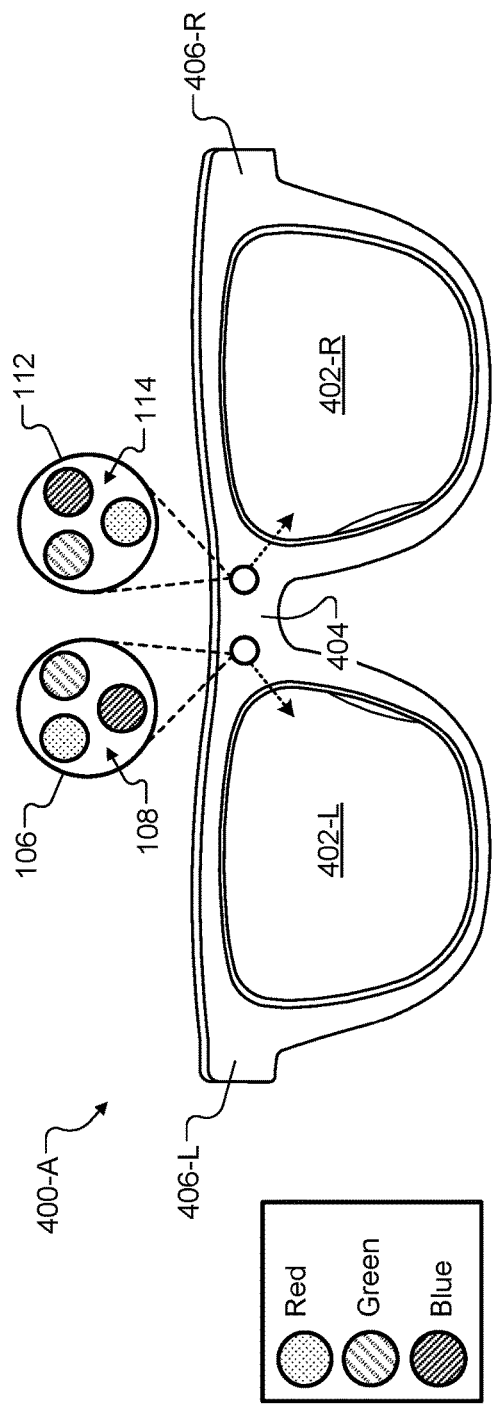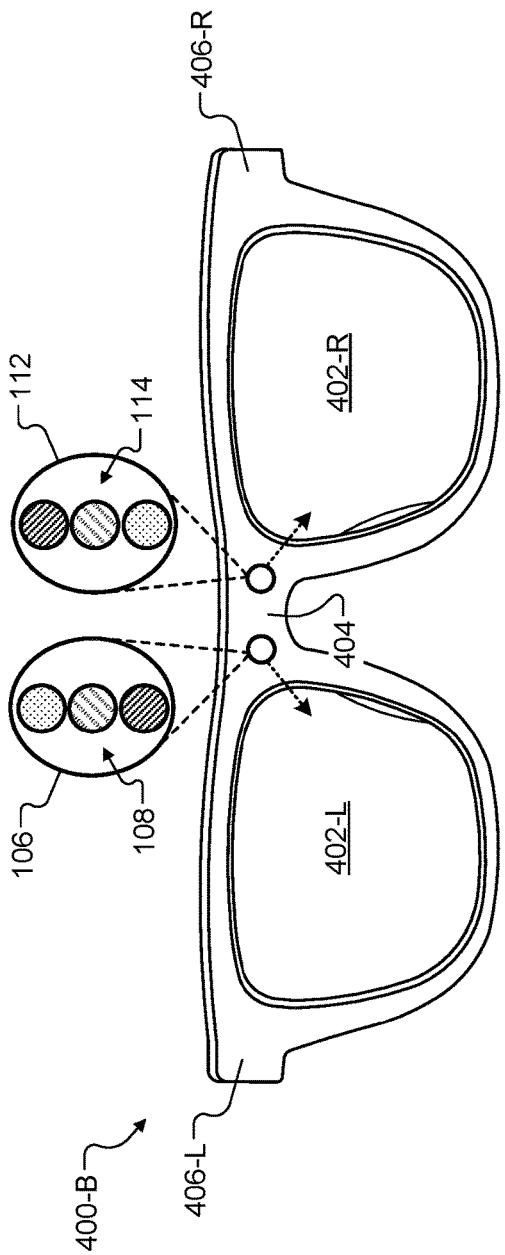
FIG. 4A
FIG. 4B

EXTENDED REALITY PROJECTION USING MONOCHROME PIXEL PANELS IN INVERTED ARRANGEMENTS

TECHNICAL FIELD

This description relates to image content projection by an extended reality projection system with a binocular head-mounted display.

BACKGROUND

Extended reality is an umbrella term referring to various technologies that serve to augment, virtualize, or otherwise extend a user's experience of reality in a variety of ways. For example, augmented reality, virtual reality, mixed reality, and other similar technologies refer to different types of extended reality that have been developed and deployed for use with entertainment, educational, vocational, and other types of applications. In certain cases, extended reality experiences may be presented on head-mounted displays to increase the immersiveness of the experience by filling the user's visual field and freeing up the user's hands for other tasks such as holding and manipulating an extended reality controller.

SUMMARY

Systems and methods for extended reality projection using monochrome pixel panels in inverted arrangements are described herein. For various reasons described herein, it may be desirable for an extended reality projection system to be characterized by a small pixel pitch parameter, or, in other words, for the pixels of a display panel integrated into the extended reality projection system to be packed as close to one another as possible. To this end, systems and methods described herein include separate, monochrome pixel panels in which pixels of the same color can be readily manufactured with a significantly decreased pitch as compared to the pitch of like-colored pixels within a conventional polychrome pixel panel. For example, rather than a polychrome pixel panel that intermingles red, green, and blue pixels (positioning the pixels such that like-colored pixels are never adjacent to one another), methods and systems described herein utilize monochrome pixel panels (e.g., a red pixel panel, a green pixel panel, and a blue pixel panel) that each include pixels of only one color so as to minimize the pitch between the pixels of that color. For example, since a red pixel panel includes only red pixels, red pixels are adjacent to other red pixels within the panel, reducing the effective pitch of the red pixels by at least half when compared to a red-green-blue (RGB) pixel panel in which there is always at least one green or blue pixel between every two red pixels.

A waveguide that guides light from the separate monochrome panels to a lens in front of a viewer's eye may include three separate apertures to input the light from the three monochrome panels in this example. However, due to challenges with balancing different channels carrying light of different colors from the different input apertures, light delivered by such a multi-aperture waveguide may tend to exhibit at least some color non-uniformity (e.g., images that appear to skew too red at one part of the image, too blue at another part of the image, etc.). Along with other potential correction techniques, methods and systems described herein help increase perceived color uniformity in extended reality projection systems by inverting arrangements of monochrome pixel panels for each of the two eyes of the user. In this way, any color non-uniformity presented to a given user's two eyes will skew in opposite and complementary ways at each part of the display screen, such that the brain of the user will ultimately perceive color across the display that is more accurate than either of the skewed colors being actually presented to each eye.

In one implementation, an extended reality projection system includes: 1) a binocular head-mounted display having a left side and a right side; 2) a first set of monochrome pixel panels distributed in a first arrangement and collectively configured to produce a color image for presentation on the left side; and 3) a second set of monochrome pixel panels distributed in a second arrangement and collectively configured to produce the color image for presentation on the right side. In this implementation, the second arrangement may be inverted from the first arrangement such that a color non-uniformity associated with the presentation on the right side is inverted from a color non-uniformity associated with the presentation on the left side. For instance, to use the example mentioned above, if the first arrangement creates a color non-uniformity for certain pixels (e.g., near the top of the panel) to skew toward the red (and away from the green and blue), the second arrangement may be inverted so as to create a color non-uniformity that skews those same pixels away from the red (and toward the green and blue). In this way, a user of the binocular head-mounted display may perceive color that is less skewed in either direction and that more accurately reflects the desired color, even while the pixel pitch benefits from having the monochrome pixel panels and multi-aperture waveguide as described above.

In another implementation, a method comprises steps including: 1) producing, by a first set of monochrome pixel panels distributed in a first arrangement within a binocular head-mounted display, a color image for presentation on a left side of the binocular head-mounted display; and 2) producing, by a second set of monochrome pixel panels distributed in a second arrangement within the binocular head-mounted display, the color image for presentation on a right side of the binocular head-mounted display. In this method, the second arrangement is again inverted from the first arrangement such that a color non-uniformity associated with the presentation on the right side is inverted from a color non-uniformity associated with the presentation on the left side.

In yet another implementation, an augmented reality glasses device includes: 1) a left lens associated with a left side of the augmented reality glasses device and configured to facilitate a display of a color image while allowing a passage of light from an environment; 2) a right lens associated with a right side of the augmented reality glasses device and configured to facilitate the display of the color image while allowing the passage of light from the environment; 3) a frame configured to hold the left lens and the right lens and including a left endpiece on the left side, a right endpiece on the right side, and a bridge between the left endpiece and the right endpiece; 4) a first set of monochrome pixel panels collectively configured to produce the color image for presentation on the left side, the first set of monochrome pixel panels integrated into the frame in a first arrangement; 5) a first waveguide configured to guide light from the first set of monochrome pixel panels to achieve the presentation on the left side, the first waveguide integrated into the left lens and including separate input apertures for each monochrome pixel panel in the first set of monochrome pixel panels; 6) a second set of monochrome pixel panels collectively configured to produce the color image for presentation on the right side, the second set of monochrome pixel panels integrated into the frame in a second arrangement that is inverted from the first arrangement such that a color non-uniformity associated with the presentation on the right side is inverted from a color non-uniformity associated with the presentation on the left side; and 7) a second waveguide configured to guide light from the second set of monochrome pixel panels to achieve the presentation on the right side, the second waveguide integrated into the right lens and including separate input apertures for each monochrome pixel panel in the second set of monochrome pixel panels.

The details of these and other implementations are set forth in the accompanying drawings and the description below. Other features will also be made apparent from the following description, drawings, and claims.

BRIEF DESCRIPTION OF THE DRAWINGS

FIGS. 4A and 4B show illustrative binocular head-mounted displays using monochrome pixel panels in example inverted arrangements in accordance with principles described herein.

DETAILED DESCRIPTION

Figure 1:
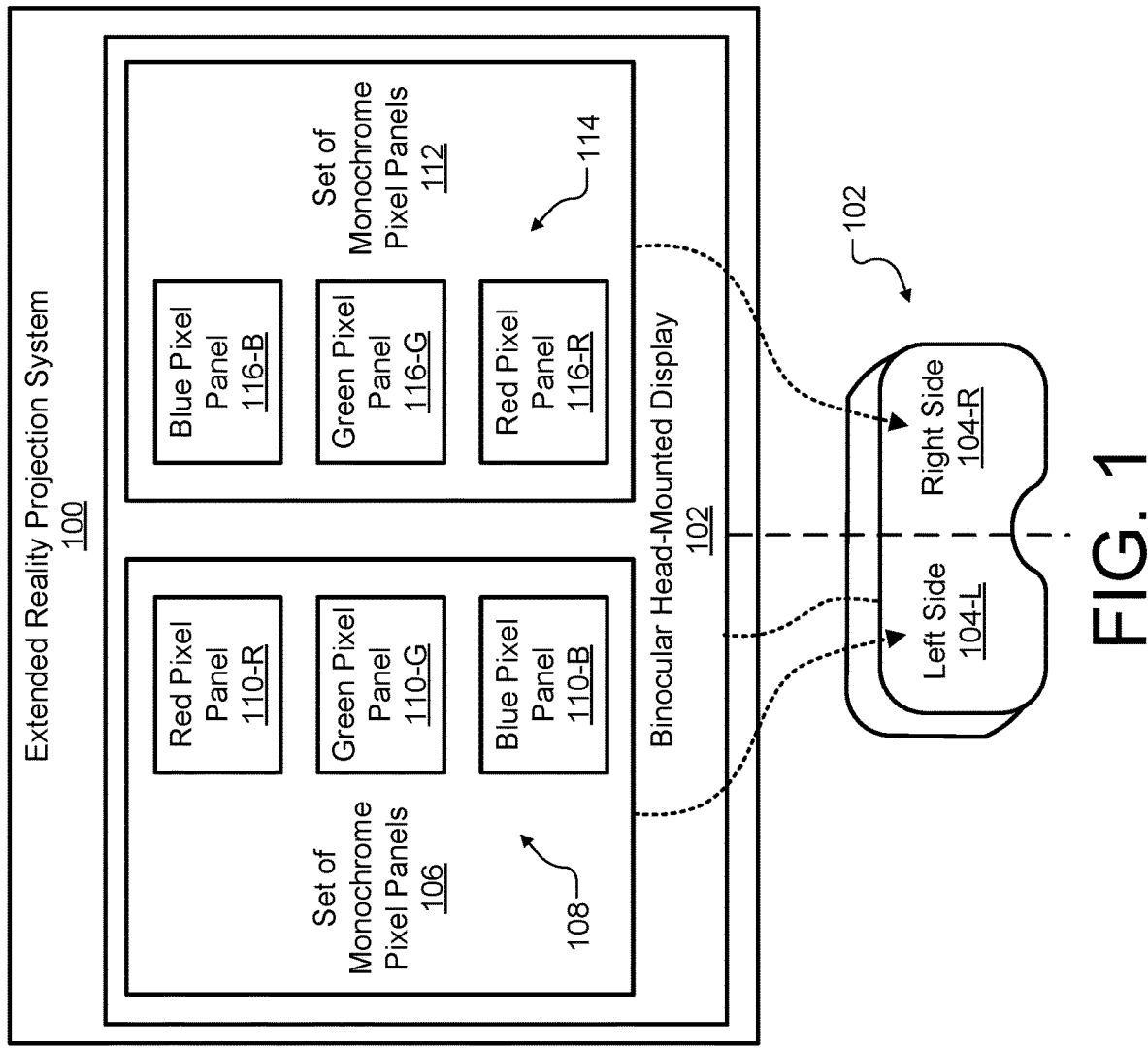
FIG. 1 shows an illustrative extended reality projection system configured with monochrome pixel panels in inverted arrangements in accordance with principles described herein.

Systems and methods for extended reality projection using monochrome pixel panels in inverted arrangements are described herein. For an extended reality projection system to provide a high-resolution image with a wide field of view while still fitting in the relatively compact form factor of a binocular head-mounted display (e.g., a pair of augmented reality glasses, a mixed reality headset, etc.), it may be desirable for a focal length of the projection system to be as short as possible. More particularly, it may be desirable for a given extended reality projection system design to have a relatively short optical track (which is associated with the focal length) so as to fit in the relatively compact form factor of a head-mounted display without compromising on the pixel resolution and field of view desired to create a highly immersive and enjoyable extended reality experience for the user.

As will be described in more detail below, the focal length of a projection system is directly related to the pixel resolution, the field of view being projected, and the pitch of the pixels on a panel (i.e., how close together the pixels are). Accordingly, for user-perceivable performance characteristics (e.g., pixel resolution, field of view, etc.) to be optimized in a particular system, a technical problem arises related to minimizing the pitch of the pixels in the system. In particular, for a color projection system in which each full-color pixel is actually made up of at least one red, one green, and one blue pixel (collectively referred to also as a red-green-blue (RGB) pixel), a technical challenge is presented to minimize the effective pitch between RGB pixels. As will be illustrated below, the effective pitch of RGB pixels may refer to a distance between any two pixels of the same color within a pixel panel (e.g., the distance from red pixel to red pixel, or from green pixel to green pixel, etc.).

As mentioned above, one technical solution to this problem of reducing effective pixel pitch is to use separate, monochrome pixel panels (i.e., pixel panels having pixels of the same color, such as an all-red pixel panel, an all-green pixel panel, and an all-blue pixel panel) in place of polychrome pixel panels (i.e., pixel panels with an array of red, green, and blue pixels interleaved in some pattern on the same panel). As will be illustrated in more detail below, this pitch reduction results from the fact that same-color pixels are adjacent to one another in monochrome pixel panels while same-color pixels are invariably separated in polychrome pixel panels where red, green, and blue pixels are intermixed on the same panel.

Even as the pixel pitch problem is addressed by the deployment of separate monochrome pixel panels and an associated multi-aperture waveguide configured to operate with the separate panels, however, an additional technical problem arises. Specifically, it may be extremely difficult for any real-world multi-aperture waveguide to perfectly balance the way light is carried from all three monochrome pixel panels to the eye of the user. For example, a particular waveguide may overemphasize one color coming into one aperture (e.g., a red color in one example) while underemphasizing another color coming into another aperture (e.g., green color in this example). This issue may vary across the screen from pixel to pixel such that, if not addressed, a user may perceive certain pixels as being overly skewed toward red, others as being overly skewed toward green, and so forth. This type of color skew is referred to herein as an inaccurate or non-uniform color presentation and will be understood to be an undesirable side effect of reducing pixel pitch by way of using separate monochrome pixel panels rather than a single polychrome pixel panel.

To address this color non-uniformity problem, systems and methods described herein present a technical solution that uses monochrome pixel panels in inverted arrangements. For example, along with other potential correction techniques, methods and systems described herein may address the color uniformity issue presented by monochrome pixel panels by inverting the arrangements of monochrome pixel panels for each of the two eyes of the user. In this way, a given user's two eyes will be presented with slightly different colors that skew in opposite and complementary directions such that the brain of the user will ultimately perceive the binocular color input as being more accurate than either of the skewed colors presented to each eye actually is. For example, one arrangement (e.g., for the left side of a binocular head-mounted display) may be inverted from another arrangement (e.g., for the right side of the binocular head-mounted display) such that color non-uniformities associated with both sides are inverted from one another to lead the brain to perceive a highly uniform color palette.

As used herein, color non-uniformities may be referred to as inverted when they complement one another in the sense of skewing in different directions so as to at least partially cancel one another out. For instance, in one example, a first arrangement may create a color non-uniformity that skews toward the red for some pixels (e.g., near the top of the screen), skews toward the blue for other pixels (e.g., near the middle of the screen), and skews toward the green for still other pixels (e.g., near the bottom of the screen). A second arrangement may be inverted from that so as to create a complementary color non-uniformity that skews away from the colors that the first arrangement skewed toward (e.g., skewing away from red for pixels near the top, away from blue near the middle, and away from green near the bottom). In this way, both the pixel pitch challenge and the color uniformity challenge described above may be concurrently addressed by the technical solution of using monochrome pixel panels in the inverted arrangements described herein.

Technical benefits of this solution may include at least that: 1) an effective color balance of the extended reality projection system is improved (i.e., such that a user of the binocular head-mounted display perceives color that is less skewed in either direction and more accurately reflects the desired color), and 2) the effective pixel pitch may be decreased as compared to conventional polychrome pixel panels so as to support significant improvements in system characteristics such as head-mounted display size and weight, screen resolution, screen field of view, and so forth.

Various implementations will now be described in more detail with reference to the figures. It will be understood that the particular implementations described below are provided as non-limiting examples and may be applied in various situations. Additionally, it will be understood that other implementations not explicitly described herein may also fall within the scope of the claims set forth below. Systems and methods described herein for extended reality projection using monochrome pixel panels in inverted arrangements may result in any or all of the technical benefits mentioned above, as well as various additional technical benefits that will be described and/or made apparent below.

FIG. 1 shows an illustrative extended reality projection system 100 configured with monochrome pixel panels in inverted arrangements in accordance with principles described herein. As shown, system 100 includes a binocular head-mounted display 102 that is illustrated both as a block in the block diagram of system 100 and as a physical device representing any suitable binocular head-mounted display such as a virtual reality headset, a mixed reality headset, an augmented reality glasses device, or the like. In the device representation of binocular head-mounted display 102, FIG. 1 shows that binocular head-mounted display 102 includes two sides labeled as a left side 104-L and a right side 104-R. Throughout this description, left and right sides will be referred to and illustrated for binocular head-mounted display 102 and various implementations thereof. It will be understood that differences between the two sides may be significant (e.g., one side having an inverted arrangement compared to the other side) even while it may be arbitrary which side, left or right, has one characteristic (e.g., one pixel panel arrangement) or the other. For this reason, a convention is used herein in which the left side of illustrated head-mounted displays is labeled on the left side of the page, even though the head-mounted display is displayed from the front (i.e., such that what is labeled as the left side would actually correspond to a right eye of a wearer of the head-mounted display).

As shown in FIG. 1, left side 104-L of binocular head-mounted display 102 may include a set 106 of monochrome pixel panels distributed in a first arrangement 108. This set 106 of monochrome pixel panels may be collectively configured to produce a color image for presentation on left side 104-L of binocular head-mounted display 102. To this end, set 106 is shown to include a red pixel panel 110-R, a green pixel panel 110-G, and a blue pixel panel 110-B (collectively referred to as pixel panels 110). Right side 104-R of binocular head-mounted display 102 is then shown to include a set 112 of monochrome pixel panels distributed in a second arrangement 114. Similar to set 106, this set 112 of monochrome pixel panels may be collectively configured to produce the color image for presentation on the right side 104-R of binocular head-mounted display 102. Accordingly, set 112 similarly includes a red pixel panel 116-R, a green pixel panel 116-G, and a blue pixel panel 116-B (collectively referred to as pixel panels 116).

While both sets 106 and 112 of monochrome pixel panels are thus configured to display full-color images using their respective red, green, and blue pixel panels, FIG. 1 shows that the arrangements 108 and 114 for the two sides 104-L and 104-R are different. Specifically, as shown, the second arrangement 114 is inverted from the first arrangement 108 such that a color non-uniformity associated with the presentation on right side 104-R is inverted from a color non-uniformity associated with the presentation on left side 104-L. In this example, the inversion that reverses the color non-uniformity is implemented by arrangement 108 stacking pixel panels 110 with red at the top, green in the middle, and blue at the bottom, while arrangement 114 stacks pixel panels 116 in the opposite order, with blue at the top, green in the middle, and red at the bottom. As has been described, even if there is some color non-uniformity arising due to the separation of the various pixel panels and the multi-aperture waveguide that will guide the light they produce (not shown in FIG. 1, but described in more detail below), these inverted arrangements 108 and 114 cause whatever color non-uniformities may exist to be complementary to one another and/or to cancel one another out in the viewer's ultimate perception. For example, if arrangement 108 makes pixels near the top of the screen to appear more red than they should to one eye of the user, arrangement 114 would, for the same reason, result in those pixels near the top of the screen appearing less red than they should to the other eye of the user. Faced with this color discrepancy from the two eyes, the user's brain may essentially split the difference in its interpretation of the color being viewed. That is, the brain may perceive those pixels to be neither too red (as per the input from the first eye) nor not red enough (as per the input from the other eye), but, rather, as right in between (i.e., the correct level of redness).

The monochrome pixel panels 110 and 116 may be implemented in any manner as may serve a particular implementation. For instance, in some cases there may be manufacturing or other efficiencies to be gained by fabricating the different monochrome pixel panels on their own semiconductor substrates using their own fabrication processes. For example, one semiconductor wafer could be manufactured with a number of red pixel panels, a different semiconductor wafer could be manufactured with a number of green pixel panels, and so forth. In other examples, the three monochrome pixel panels in a given set (i.e., the pixel panels 110 of set 106 or the pixel panels 116 of set 112) could all be manufactured on different portions of a same die (i.e., the three panels sharing a same physical substrate but being situated in separate sections instead of being intermixed). For both of these types of implementations, it will be understood that the waveguides associated with the sets of monochrome pixel panels may be multi-aperture waveguides with different in-couplers for each color. This may allow the waveguides to be efficiently tuned to the specific colors they are carrying in each channel and may be compensated for, at least in part, using inverted arrangements described herein (e.g., such as arrangements 108 and 114).

Figure 2:
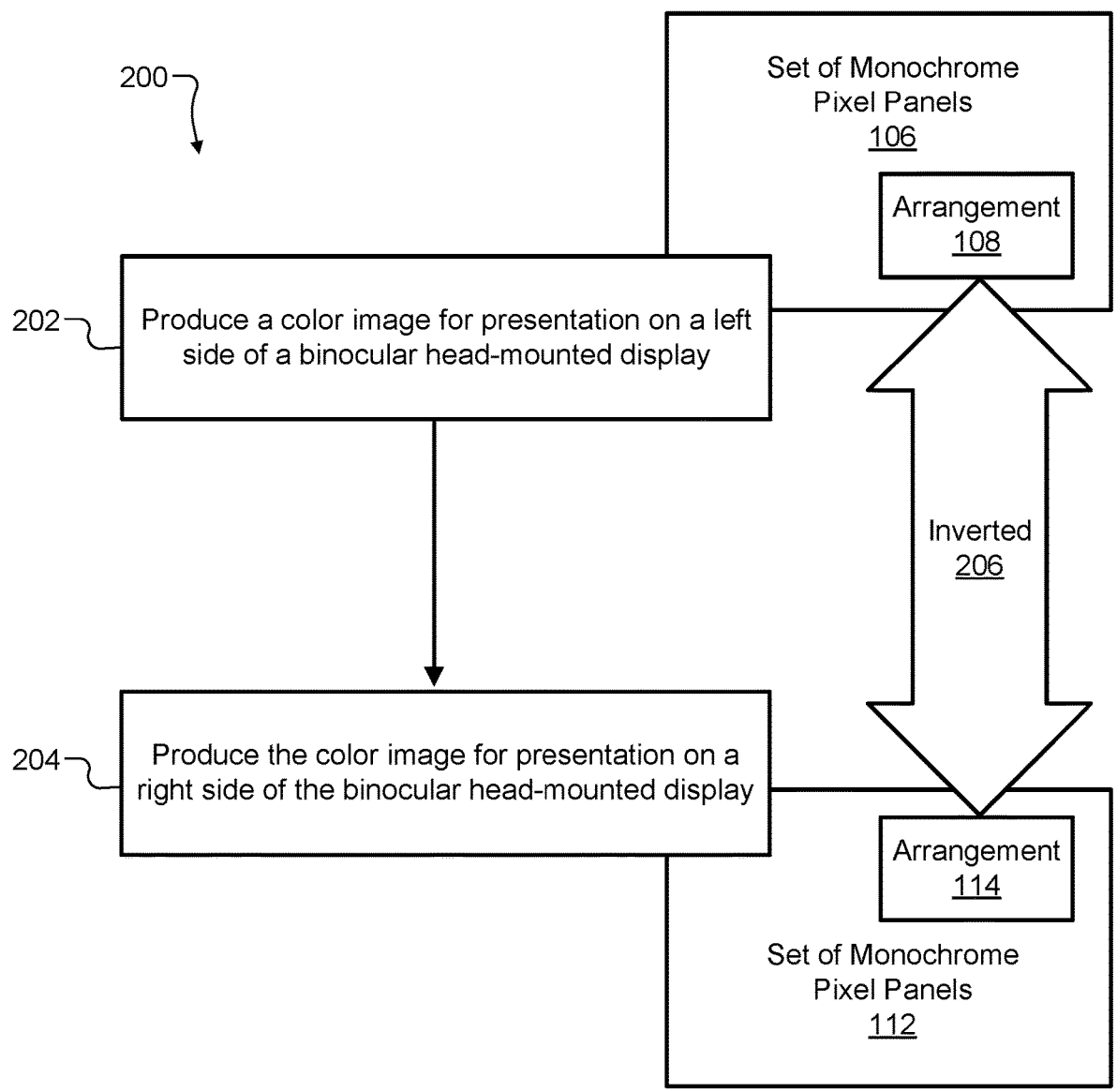
FIG. 2 shows an illustrative method for extended reality projection using monochrome pixel panels in inverted arrangements in accordance with principles described herein.

FIG. 2 shows an illustrative method 200 for extended reality projection using monochrome pixel panels in inverted arrangements in accordance with principles described herein. While FIG. 2 shows illustrative operations 202 and 204 according to one implementation, other implementations of method 200 may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. Each of operations 202 and 204 of method 200 will now be described in more detail as the operations may be performed by an implementation of system 100. More particularly, method 200 may be performed by the respective sets 106 and 112 of monochrome pixel panels with their different respective arrangements 108 and 114, as illustrated to the side of operations 202 and 204 in FIG. 2.

At operation 202, system 100 may produce a color image for presentation on a left side of a binocular head-mounted display (e.g., binocular head-mounted display 102). As shown, operation 202 may be performed by a first set of monochrome pixel panels (e.g., set 106) distributed in a first arrangement (e.g., arrangement 108) within the binocular head-mounted display.

At operation 204, system 100 may produce the color image (i.e., the same color image as produced by the first set of monochrome pixel panels at operation 202) for presentation on a right side of the binocular head-mounted display. As shown, for instance, operation 204 may be performed by a second set of monochrome pixel panels (e.g., set 112) distributed in a second arrangement (e.g., arrangement 114) within the binocular head-mounted display.

As illustrated by an arrow 206 in FIG. 2, the second arrangement (e.g., arrangement 114) may be inverted from the first arrangement (e.g., first arrangement 108) such that a color non-uniformity associated with the presentation on the right side is inverted from a color non-uniformity associated with the presentation on the left side. Accordingly, as has been described, color non-uniformity perceived by each individual eye of a user may be mitigated or at least somewhat compensated for or canceled out in the final perception of the user's brain.

The optical pathway between the pixel panels and the eyes of a user for a given extended reality projection system generally include several components. First, projector optics (also referred to as a projector optical system) may include a series of lenses and/or other optical devices immediately adjacent to the pixel panels to process and prepare light generated by the pixel panels. For example, while each pixel may produce light that radiates in a wide angle (e.g., acting as or approximating a Lambertian emitter), an optical track of projector optics may be configured collimate the light to a certain diameter (e.g., to make the light from each pixel travel in parallel angles). After propagating through this projector optical system, the now-collimated light may enter a waveguide integrated or otherwise associated with a lens positioned in front of one of the user's eyes. The waveguide may be configured to direct or guide the light to enter the user's eye at an angle that simulates light the user would see if viewing a real object some distance away. As such, the user need not focus on an actual image presented immediately before their eyes on the lens, but, rather, may focus their eyes as if looking at something several meters away. In other words, the waveguide may be configured to direct the light to enter the user's eyes at the proper angles to simulate light originating at a distance farther than the distance between the eyes and the lenses of the head-mounted display.

As mentioned above, various design parameters desirable for an extended reality projection system may include a high pixel resolution (e.g., to show intricate details of projected content), a wide field of view (e.g., to flexibly project content to a wide range within the user's visual field), and a short optical track length (e.g., to fit in the form factor of a streamlined head-mounted display device). Optical physics may dictate the relationship between these features as per Equation 1:

$$\text{Focal\_Length} = \frac{\text{Resolution} * FOV * \text{Pitch}}{2 * \tan\left(\frac{FOV}{2}\right)} \quad \text{(Eq 1)}$$

In Equation 1, Focal_Length may be equal or related to the optical track length through the projector optical system described above. As mentioned, it may be desirable for this to be short enough (e.g., a few millimeters) to fit within a head-mounted display (e.g., within a bridge or endpiece of a pair of glasses, etc.).

Resolution refers to how many pixels there are per degree of the viewer's visual field. For color images, the resolution of interest may be related to full-color RGB pixels, such that Resolution expresses how many RGB pixels per degree are presented to the viewer.

FOV refers to the degrees of the field of view that is presented in total. It is desirable for this to be as large as possible so that content can not only be presented in areas directly in front of the user's eyes but also in side areas of the user's peripheral vision and so forth.

Pitch refers to the pixel pitch, or distance between adjacent pixels. As has been mentioned, the effective pitch value of interest for RGB pixels is the distance between any two adjacent pixels of the same color, which may be reduced by employing a plurality of monochrome pixel panels rather than interleaved pixel colors on a single polychrome pixel panel.

Figure 3:
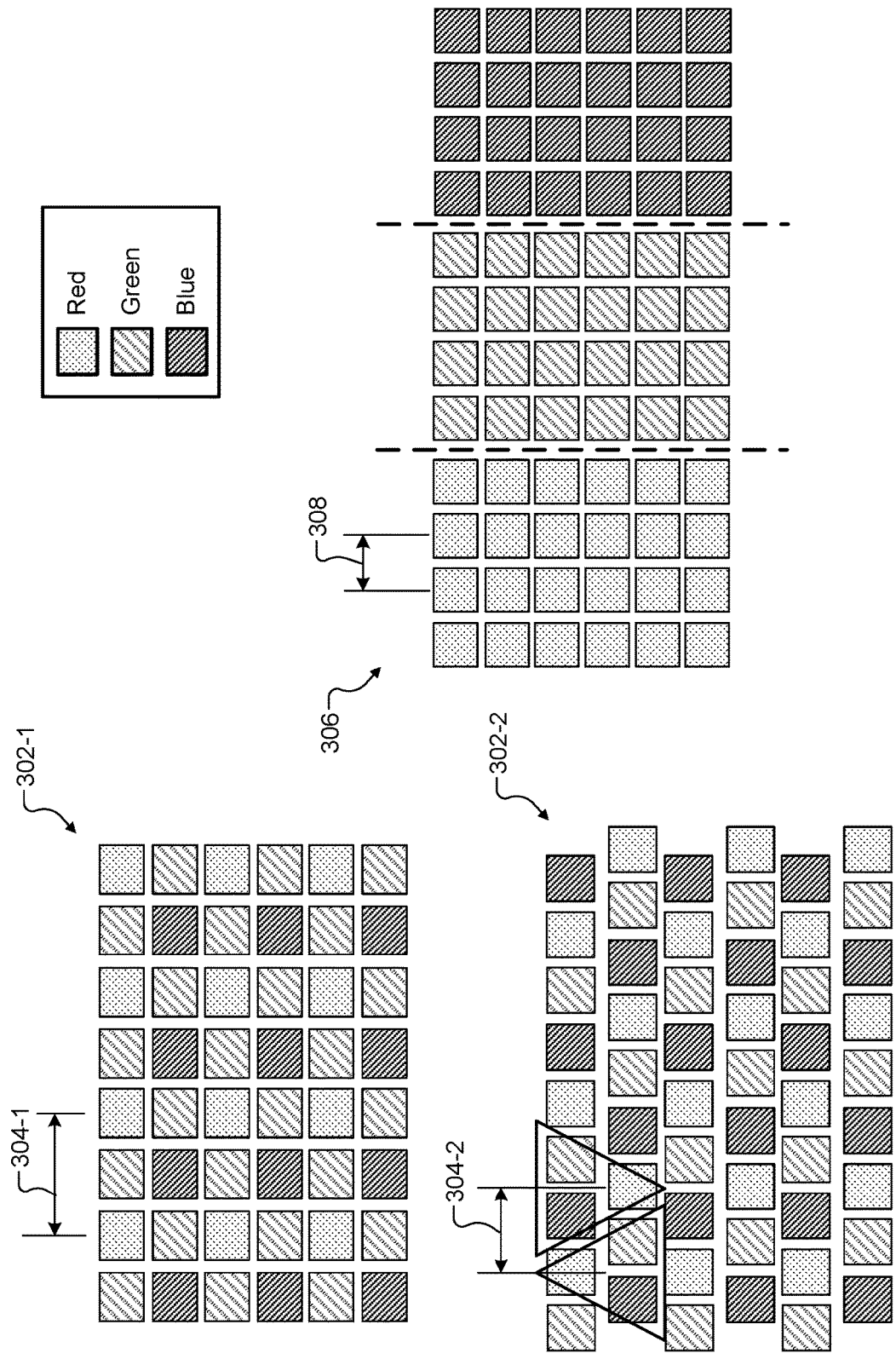
FIG. 3 shows pixel pitch characteristics for illustrative polychrome and monochrome pixel panels in accordance with principles described herein.

To illustrate, FIG. 3 shows pixel pitch characteristics for illustrative polychrome and monochrome pixel panels in accordance with principles described herein. Since pixel pitch has a direct relationship with desirable system characteristics (e.g. the relationship represented in Equation 1), it may be desirable for the pixel pitch to be small so as to allow for other desirable characteristics (e.g., the short focal length, the high resolution, the wide field of view, etc.) to be achieved. To this end, FIG. 3 illustrates how using a set of monochrome pixel panels, rather than one a conventional polychrome pixel panel, may help reduce the pixel pitch.

FIG. 3 shows portions of two example pixel arrays 302-1 and 302-2 within illustrative polychrome pixel panels. The individual pixels in pixel arrays 302-1 and 302-2 are depicted as squares with different types of fill styles representing their color. Specifically, as indicated by a key in the corner of the figure, a dotted fill style indicates that a given pixel represents a red pixel, a wide cross-hatching style (diagonal-down-to-the-left) indicates that a given pixel represents a green pixel, and a narrow cross-hatching style (diagonal-down-to-the-right) indicates that a given pixel represents a blue pixel. The two different pixel arrays 302-1 and 302-2 are shown to have polychrome pixels in different arrangements. For example, pixel array 302-1 aligns all of the pixels in a grid of rows and columns, while pixel array 302-2 is similarly aligned except that every other row is offset by half a pixel, as shown. In both examples red, green, and blue pixels are included in equal numbers in a repeating pattern, and a particular pitch equal to the distance between two pixels of the same color (e.g., a red color in this example) is labeled. Specifically, pitch 304-1 for pixel array 302-1 is shown to be as wide as two pixels, while a pitch 304-2 for pixel array 302-2 is shown to be only as wide as 1.5 pixels, but to find its nearest, like-colored neighbor one row down.

In either case, the pitch 304 of these pixel arrays 302 is significantly greater than for a pixel array 306 of an illustrative monochrome pixel panel. Pixel array 306 is shown to have a pitch 308, which is only one pixel across (e.g., significantly shorter than either pitch 304-1 or pitch 304-2). For example, if pitch 304-1 is 10 microns (i.e., 0.010 mm) And pitch 304-2 is 10 microns, pitch 308 of each of the pixel arrays 306 of the monochrome pixel panels described herein may be just 5 microns (i.e., 0.005 mm) if the monochrome pixel panel was manufactured using the same processes (i.e., so that the pixels are the same size). In other words, all else being equal, the effective pixel pitch of an RGB pixel maybe reduced by around 50% by using monochrome pixel panels with monochrome pixel arrays 306 in place of polychrome pixel panels with polychrome pixel arrays 302. This is a significant pitch decrease that may allow for one or more of: a shorter optical track length, an increased resolution, and/or an increased field of view, as set forth in Equation 1 above. To give a quantitative example, for instance, the focal length for an optical system having a 30 pixel-per-degree (ppd) resolution and 30° field of view would decrease from about 16.8 mm to 8.4 mm by reducing the pixel pitch from 10 microns to 5 microns in this way, thereby making it easier to fit the projection optics into the limited space of a binocular head-mounted display such as a pair of glasses of the like.

As has been described, using separate monochrome pixel panels (such as illustrated by pixel array 306) rather than a polychrome pixel panel with pixels in an interleaved pattern (such as illustrated by pixel arrays 302-1 and 302-2) may present a solution to one technical problem (reducing pixel pitch to facilitate high resolution and field of view with an optical track length that fits into a small space) while also presenting a different technical challenge related to color non-uniformity. Specifically, it may be difficult for a multi-aperture waveguide configured for use with separate monochrome pixel panels to deliver light from the separate panels to all portions of the user's visible field in a perfectly uniform way. A variety of technical solutions may be applied to mitigate this non-uniformity problem. For example, grating structures and other design parameters within the waveguide may be designed to try to address this issue, adjustments in software to the color data itself may be made to compensate for known non-uniformity characterized for a particular system, and so forth. These and other approaches may be implemented separately or in combination with one another for a given extended reality projection system design that includes a plurality of monochrome pixel panels. However, many of these types of solutions come with their own costs, such as tending to decrease the brightness of the display that the user sees. For example, if software is used to make one part of the display a little less red due to known color non-uniformity for that part of the display, the pixels associated with that part of the display may also be a little less bright as the redness is reduced. This may be suitable for some use cases, though, for other use cases, it may be desirable to employ a solution to the color non-uniformity problem that does not come with the brightness reduction side effect.

As described herein, performing extended reality projection using monochrome pixel panels in inverted arrangements provides such a solution. By inverting the arrangement of monochrome pixel panels on the two sides of a binocular head-mounted display in ways described herein, the color non-uniformity issue can be partially or entirely mitigated without negative side effects (such as the brightness reduction described above). In various examples, this arrangement inversion may be used alone or as one part of a more comprehensive solution for mitigating the color non-uniformity challenge (e.g., along with one or more of the other strategies described above).

FIGS. 4A through 10 will now be described to further illustrate these principles using a variety of example implementations with a variety of additional useful features. Each of these figures shows an illustrative binocular head-mounted display using monochrome pixel panels in an example inverted arrangement in accordance with principles described herein. The binocular head-mounted display in these examples will be illustrated as augmented reality glasses devices, though it will be understood that the same principles being illustrated could be applied to other types of binocular head-mounted displays, such as virtual reality headsets, mixed reality headsets, other type of augmented reality headsets, or the like.

FIG. 4A shows a binocular head-mounted display that is implemented by an augmented reality glasses device 400-A that includes a left lens 402-L and a right lens 402-R each configured to facilitate a display of a color image while allowing a passage of light from an environment. As noted above, left and right are labeled and referred to in the following description from a perspective in front of the glasses, though it will be understood that a person wearing the glasses would have their left and right reversed from these labels. Augmented reality glasses device 400-A is also shown to include a frame configured to hold left lens 402-L and right lens 402-R. As shown, the glasses frame may have a bridge 404, a left endpiece 406-L, and a right endpiece 406-R. These features of the augmented reality glasses device (i.e., the lenses 402-L and 402-R, the frame having the bridge 404 and the endpieces 406-L and 406-R, etc.) are included not only for the implementation of augmented reality glasses device 400-A but also for the other implementations of the augmented reality glasses device illustrated and described with respect to FIGS. 4B-10.

In the example of FIG. 4A, set 106 of monochrome pixel panels and set 112 of monochrome pixel panels is shown to be integrated into bridge 404 of the frame. In this implementation, both the first arrangement 108 and the second arrangement 114 of the monochrome pixel panels are shown to be triangular arrangements. As such, the inversion of arrangements 108 and 114 is implemented by the green monochrome pixel panel being on the inside corner of each triangular arrangement, while the red and blue monochrome pixel panels are swapped (one higher and one lower) in the inverted arrangements 108 and 114. In non-inverted arrangements, the triangular arrangements might instead mirror one another, without the red and blue panels being swapped in this way.

In the example of FIG. 4B, an augmented reality glasses device 400-B also shows set 106 of monochrome pixel panels and set 112 of monochrome pixel panels being integrated into bridge 404 of the frame. However, in this implementation, both the first arrangement 108 and the second arrangement 114 of the monochrome pixel panels are shown to be vertically-stacked arrangements. As such, the inversion of arrangements 108 and 114 is implemented by the green monochrome pixel panel being in the middle of the stack, while the red and blue monochrome pixel panels are swapped (one at the top of the stack and the other at the bottom) in the inverted arrangements 108 and 114. In non-inverted arrangements, the vertically-stacked arrangements might instead stack the panel colors in the same order, rather than in the reverse order shown in FIG. 4B. It will be understood that other possible types of inverted arrangements of monochrome pixel panels may be employed as may serve other particular implementations. For instance, inverted horizontal arrangements or other such configurations could be used that are inverted in similar ways as illustrated in FIGS. 4A and 4B.

Figure 5A:
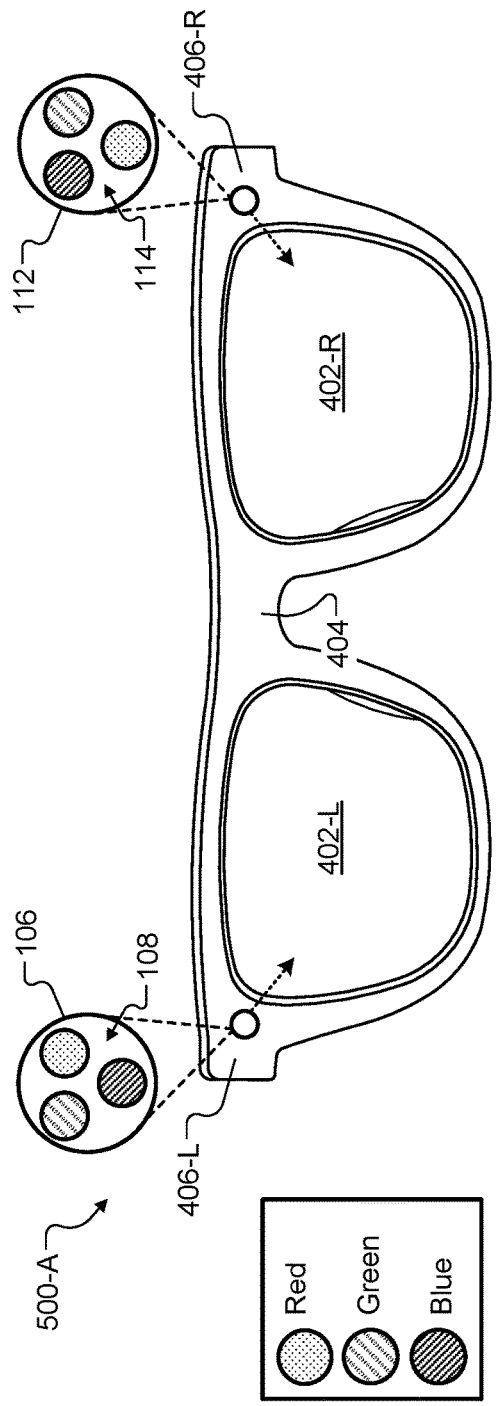
FIGS. 5A and 5B show additional illustrative binocular head-mounted displays using monochrome pixel panels in additional example inverted arrangements in accordance with principles described herein.
Figure 5B:
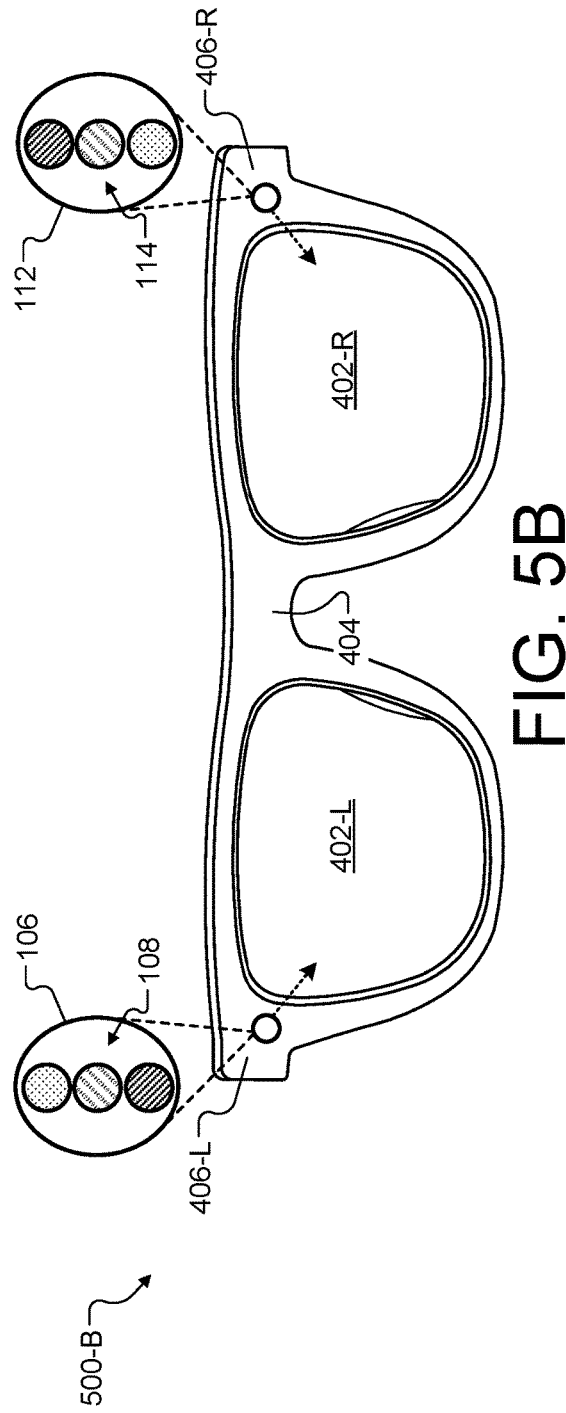

FIGS. 5A and 5B show additional illustrative binocular head-mounted displays using monochrome pixel panels in additional example inverted arrangements in accordance with principles described herein. Specifically, FIG. 5A depicts an example binocular head-mounted display implemented by an augmented reality glasses device 500-A and FIG. 5B depicts an example binocular head-mounted display implemented by an augmented reality glasses device 500-B. As with the glasses devices illustrated and described above in relation to FIGS. 4A and 4B, each of augmented reality glasses devices 500-A and 500-B is shown to include the left lens 402-L and the right lens 402-R each configured to facilitate a display of the color image while allowing a passage of light from an environment. These glasses device implementations also are each shown to include the frame configured to hold left lens 402-L and right lens 402-R, the frame having the left endpiece 406-L and the right endpiece 406-R. Whereas the respective sets 106 and 112 of monochrome pixel panels were shown to be integrated into bridge 404 in the examples of augmented reality glasses devices 400-A and 400-B, however, FIGS. 5A and 5B show examples in which these sets of monochrome pixel panels are instead integrated into the endpieces of the glasses. Specifically, as shown in both augmented reality glasses devices 500-A and 500-B, set 106 of monochrome pixel panels in these implementations is integrated into left endpiece 406-L, while set 112 of monochrome pixel panels is integrated into right endpiece 406-R.

As with FIGS. 4A and 4B described above, a difference between the implementations of FIGS. 5A and 5B is in the shape of inverted arrangements 108 and 114. Specifically, augmented reality glasses device 500-A shows arrangements 108 and 114 to each be implemented as triangular arrangements that are inverted in a similar way as described above in relation to augmented reality glasses device 400-A. Augmented reality glasses device 500-B then shows arrangements 108 and 114 to each be implemented as vertically-stacked arrangements that are again inverted by having the colors stacked in opposite orders from top to bottom.

Along with the features explicitly illustrated in the preceding figures, multi-aperture waveguides have been described as being configured to carry or otherwise guide or direct light from the monochrome pixel panels to the eyes of a person wearing the binocular head-mounted display. As one example implementation using the glasses form factor, for instance, an augmented reality glasses device may include: 1) a left lens (e.g., left lens 402-L) associated with a left side (e.g., left side 104-L) of the augmented reality glasses device and configured to facilitate a display of a color image while allowing a passage of light from an environment; 2) a right lens (e.g., right lens 402-R) associated with a right side (e.g., right side 104-R) of the augmented reality glasses device and configured to facilitate the display of the color image while allowing the passage of light from the environment; 3) a frame configured to hold the left lens and the right lens and including a left endpiece (e.g., left endpiece 406-L) on the left side, a right endpiece (e.g., right endpiece 406-R) on the right side, and a bridge (e.g., bridge 404) between the left endpiece and the right endpiece; 4) a first set of monochrome pixel panels (e.g., set 106) collectively configured to produce the color image for presentation on the left side, the first set of monochrome pixel panels integrated into the frame in a first arrangement (e.g., arrangement 108); 5) a first waveguide configured to guide light from the first set of monochrome pixel panels to achieve the presentation on the left side, the first waveguide integrated into the left lens and including separate input apertures for each monochrome pixel panel in the first set of monochrome pixel panels; 6) a second set of monochrome pixel panels (e.g., set 112) collectively configured to produce the color image for presentation on the right side, the second set of monochrome pixel panels integrated into the frame in a second arrangement (e.g., arrangement 114) that is inverted from the first arrangement such that a color non-uniformity associated with the presentation on the right side is inverted from a color non-uniformity associated with the presentation on the left side; and 7) a second waveguide configured to guide light from the second set of monochrome pixel panels to achieve the presentation on the right side, the second waveguide integrated into the right lens and including separate input apertures for each monochrome pixel panel in the second set of monochrome pixel panels. To further illustrate, FIGS. 6-10 show various aspects of multi-aperture waveguides used by illustrative binocular head-mounted displays, such as the first and second waveguides mentioned for this example implementation.

Figure 6:
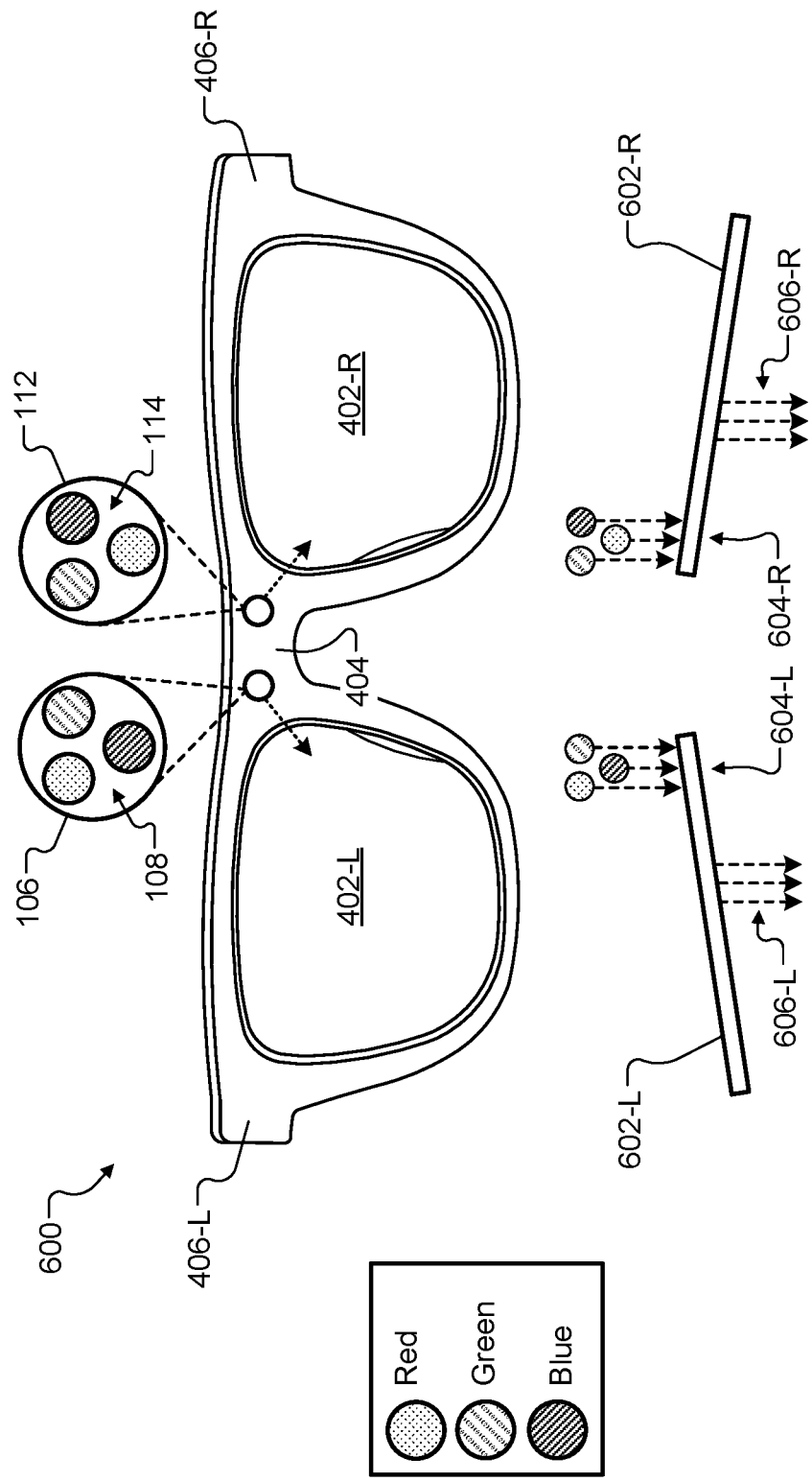
FIGS. 6-10 show illustrative aspects of various multi-aperture waveguides used by illustrative binocular head-mounted displays in accordance with principles described herein.

In FIG. 6, an example augmented reality glasses device 600 is shown with the same features, including the inverted triangular arrangements of monochrome pixel panels, as illustrated and above in relation to FIG. 4A. Additionally, as depicted from a bottom view below the glasses device in FIG. 6, augmented reality glasses device 600 is shown to include a first waveguide 602-L that will be understood to be integrated into left lens 402-L and a second waveguide 602-R that will be understood to be integrated into right lens 402-R. The waveguide 602-L may be configured to guide light from set 106 of the monochrome pixel panels to achieve the presentation on the left side of the glasses device. To this end, as illustrated by individual arrows extending to waveguide 602-L from small circles representing the monochrome pixel panels of set 106, waveguide 602-L is shown to include a set 604-L of separate input apertures for each monochrome pixel panel in set 106 of monochrome pixel panels. As light is input at this set 604-L of separate input apertures, waveguide 602-L may be configured to guide the different colors of light to be output at proper angles to an eye of the user as light 606-L.

Similarly, waveguide 602-R may be configured to guide light from set 112 of the monochrome pixel panels to achieve the presentation on the right side of the glasses device. To this end, as illustrated by individual arrows extending to waveguide 602-R from small circles representing the monochrome pixel panels of set 112, the waveguide 602-R is shown to include a set 604-R of separate input apertures for each monochrome pixel panel in set 112 of monochrome pixel panels. As light is input at this set 604-R of separate input apertures, waveguide 602-R may be configured to guide the different colors of light to be output at proper angles to the other eye of the user as light 606-R. Due to the inverted arrangements 108 and 114 of the monochrome pixel panels, each of the eyes of the user may see color non-uniformities that complement and are perceived as cancelling one another out, as has been described.

In the example of augmented reality glasses device 600, waveguides 602-L and 602-R each include a single set of input apertures to accept light from a single set (i.e., set 106 or 112) of monochrome pixel panels. In other implementations, however, multiple sets of separate input apertures may be implemented on a single waveguide to accept light from multiple sets of monochrome pixel panels. For example, rather than being limited to sets of monochrome pixel panels located either on bridge 404 (as shown in FIGS. 4A and 4B) or on endpieces 406-L and 406-R (as shown in FIGS. 5A and 5B), certain implementations may include respective sets of monochrome pixel panels located both on bridge 404 and on endpieces 406-L and 406-R. Both sets of panels for a given side (one disposed on the bridge and the other on one of the endpieces) may be associated with their own set of input apertures on the same waveguide associated with that side. In this way, at least some compensation of color non-uniformity may be accomplished not only from side to side of a binocular head-mounted display (i.e., relying on both eyes of a user to achieve its intended effect), but also within a single side of a head-mounted display (i.e., so as to achieve its intended effect for each eye independently). Accordingly, this type of approach may provide benefit to head-mounted displays that present content monocularly (i.e., to only one eye) and/or to users whose brain relies on input exclusively or largely from one eye and not the other. Additionally, further compensation of color non-uniformity between inverted arrangements on either side of a binocular head-mounted display configured this way may also be achieved.

Figure 7:
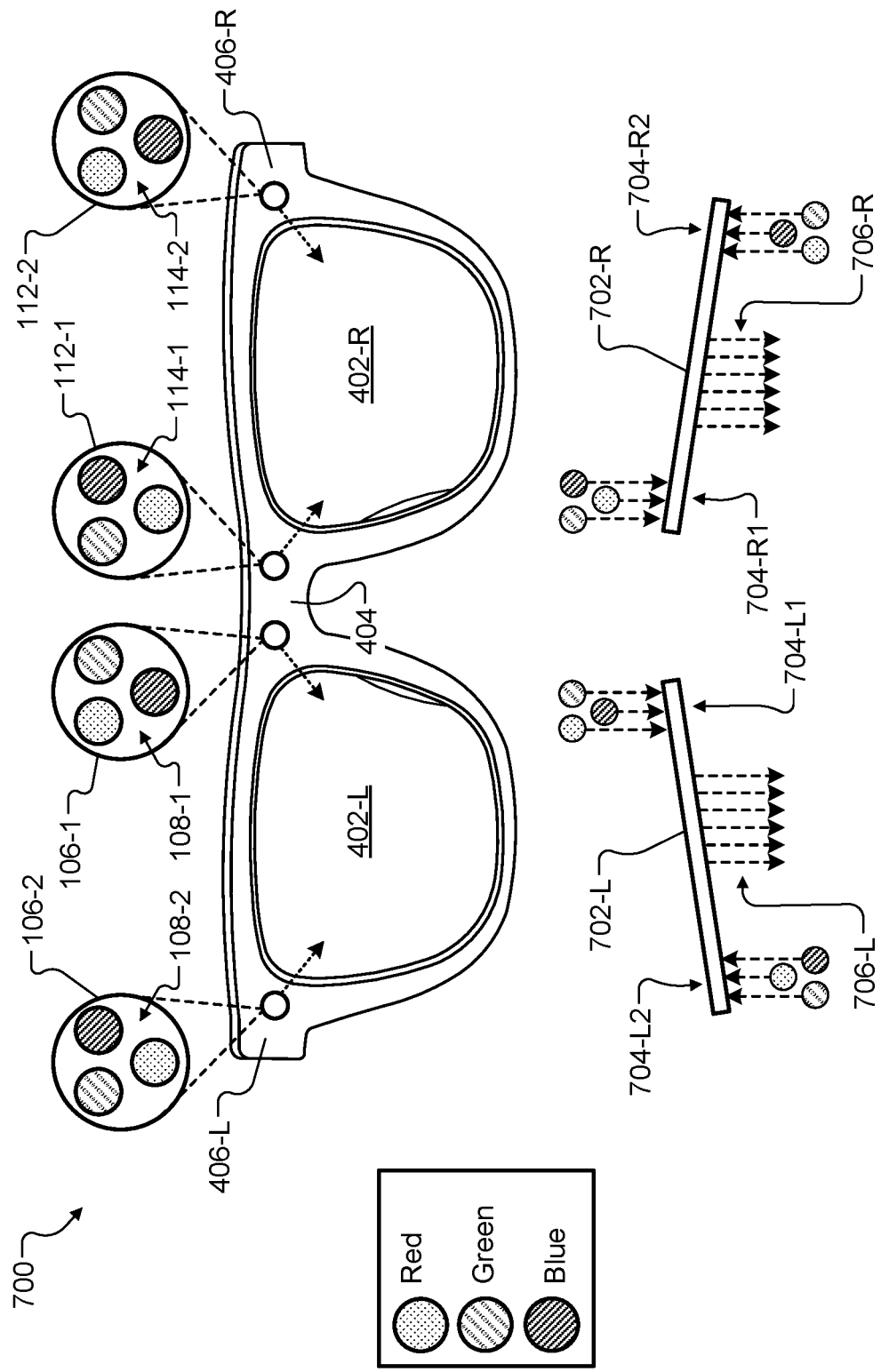

To illustrate these principles, FIG. 7 shows an augmented reality glasses device 700 that adds to the first and second sets of monochrome pixel panels and first and second waveguides described in previous examples. Specifically, as shown, augmented reality glasses device 700 includes a set 106-1 of monochrome pixel panels in an arrangement 108-1 (on the left side) and a set 112-1 of monochrome pixel panels in an arrangement 114-1 (on the right side). Additionally, augmented reality glasses device 700 further includes a set 106-2 of monochrome pixel panels distributed in an arrangement 108-2 and collectively configured to produce the color image for presentation on the left side, as well as a set 112-2 of monochrome pixel panels distributed in an arrangement 114-2 and collectively configured to produce the color image for presentation on the right side. As shown, the binocular head-mounted display implemented by augmented reality glasses device 700 may be implemented with the frame having: 1) the bridge 404 into which set 106-1 of monochrome pixel panels and set 112-1 of monochrome pixel panels is integrated; 2) the left endpiece 406-L into which set 106-2 of monochrome pixel panels is integrated; and 3) the right endpiece 406-R into which set 112-2 of monochrome pixel panels is integrated.

As further illustrated in FIG. 7, arrangement 108-2 may be inverted from arrangement 108-1, such that mitigation of color non-uniformity described above with respect to differences on the left and right side may be achieved on the left side even when taken in isolation. Similarly, arrangement 114-2 is shown to be inverted from arrangement 114-1, such that this mitigation of color non-uniformity may likewise be achieved on the right side in isolation. Additionally, as in other implementations described above, it is noted that arrangements 108-1 and 114-1 on bridge 404 are inverted from one another, as are arrangements 108-2 and 114-2 on the respective endpieces 406-L and 406-R. Accordingly, additional mitigation of color non-uniformity between the two sides (as described for implementations illustrated above) may further be achieved in this implementation along with the independent mitigation at each side.

To implement these features, augmented reality glasses device 700 is shown to include a waveguide 702-L associated with left lens 402-L and a waveguide 702-R associated with right lens 402-R. As with waveguides 602-L and 602-R described above, waveguides 702-L and 702-R may each be integrated with their respective lenses and configured to guide light from monochrome pixel panels to achieve the presentation of the color image on their respective side. However, whereas waveguides 602-L and 602-R each included just one set of separate input apertures for one set of monochrome pixel panels, waveguides 702-L and 702-R are shown to further include additional sets of separate input apertures for the additional sets of monochrome pixel panels included in augmented reality glasses device 700. Specifically, as shown, waveguide 702-L may be configured to guide light from both sets 106-1 and 106-2 of monochrome pixel panels to achieve the presentation on the left side, and, to this end, may include sets 704-L1 and 704-L2 of separate input apertures for each of sets 106-1 and 106-2 of monochrome pixel panels. Specifically, as illustrated, a set 704-L1 of three separate input apertures may accept light from the three monochrome pixel panels in set 106-1, a set 704-L2 of three separate input apertures may accept light from the three monochrome pixel panels in set 106-2, and waveguide 702-L may guide light from both of these sets of pixel panels to be presented to an eye of the user as light 706-L.

Similarly, as further shown, waveguide 702-R may be configured to guide light from both sets 112-1 and 112-2 of monochrome pixel panels to achieve the presentation on the right side, and, to this end, may include respective sets 704-R1 and 704-R2 of separate input apertures for each monochrome pixel panel in the respective sets of monochrome pixel panels. Specifically, as illustrated, a set 704-R1 of three separate input apertures may accept light from the three monochrome pixel panels in set 112-1, a set 704-R2 of three separate input apertures may accept light from the three monochrome pixel panels in set 112-2, and waveguide 702-R may guide light from both of these sets of pixel panels to be presented to the other eye of the user as light 706-R.

Along with benefits already mentioned (e.g., mitigation of color non-uniformity achieved independently for each side in addition to being achieved binocularly between the sides), additional benefits may also arise from implementations with multiple sets of monochrome pixel panels per side as illustrated in augmented reality glasses device 700. As one example, additional brightness may be achieved by having two monochrome pixel panels per eye for each color as opposed to just a singular panel per eye. As another example, certain variations between the monochrome pixel panels and waveguide input apertures for a given color could be introduced to provide additional advantages. For instance, the two monochrome pixel panels of the same color on one side could employ variations in polarity (e.g., S-polarization versus P-polarization, etc.) or frequency (e.g., a 633 nanometer red versus a 650 nanometer red, etc.) to address challenges or tradeoffs that may be faced (e.g., in the waveguide design or tuning) and/or to provide other benefits (e.g., such as having light of the same color being able to pass through with minimal interference). In other examples, such variations may be dispensed with and like monochrome pixel panels and waveguide channels for a given color may be identical.

Figure 9:
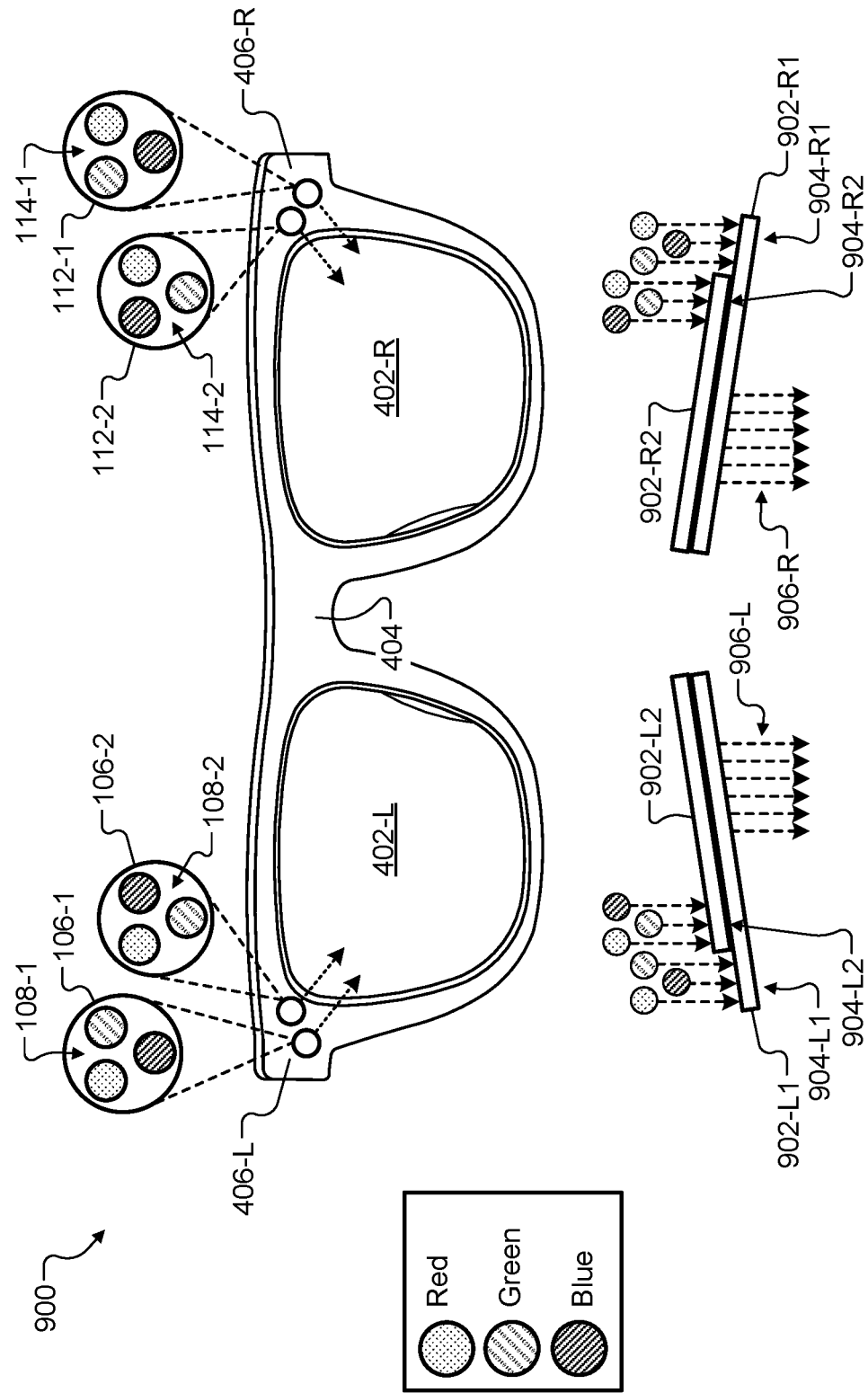
Figure 10:
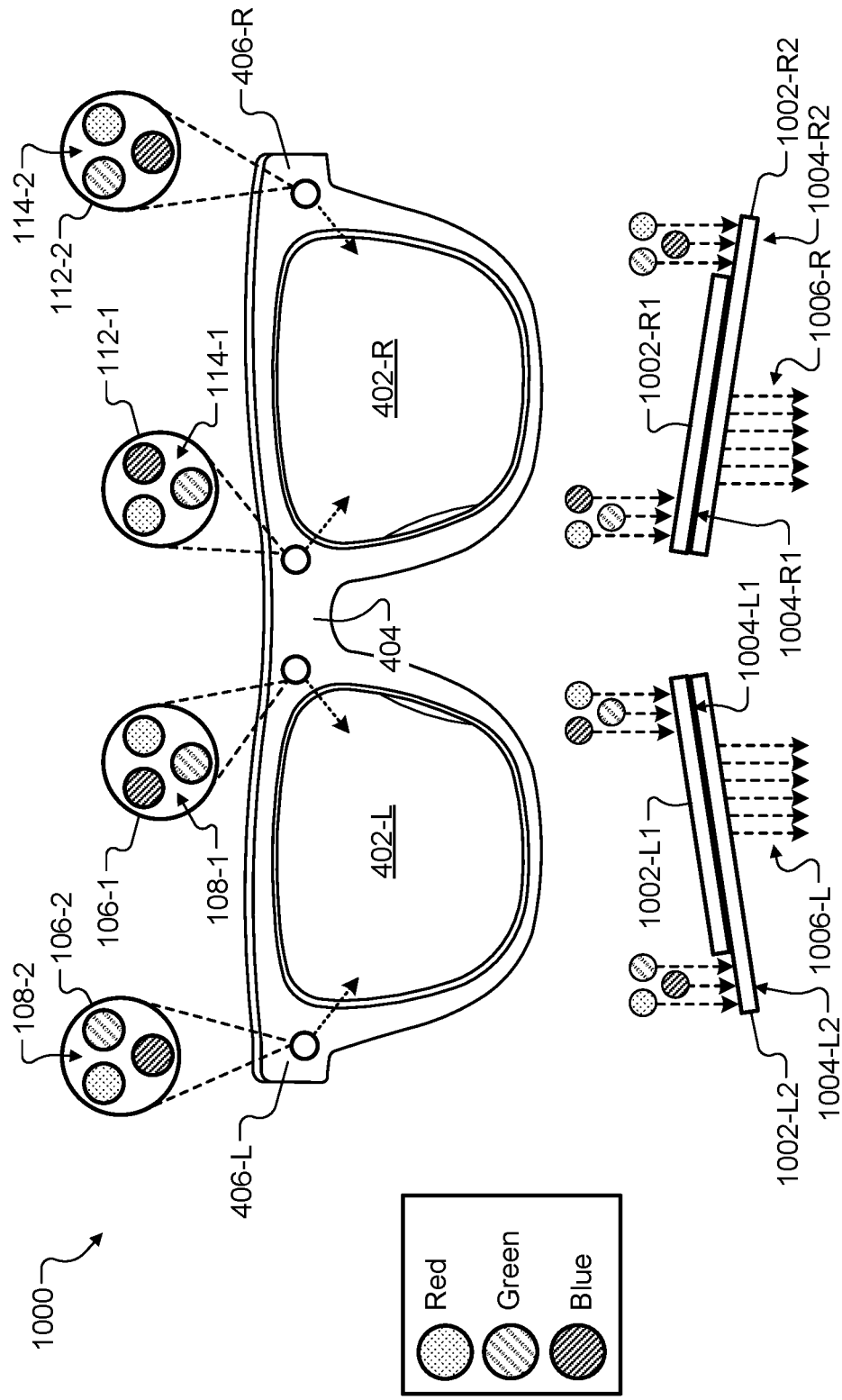

In still other types of implementations, the same types of benefits and advantages described in relation to FIG. 7 may be gained by employing multiple waveguides on each side to accommodate the multiple sets of input apertures accepting the light from the multiple sets of monochrome pixel panels. For example, certain implementations may deploy two sets of monochrome pixel panels per side (e.g., both to the bridge, both to the endpiece, one to the bridge and one to the endpiece, etc.), each being associated with a dedicated waveguide having a respective set of input apertures. As with the implementation described in relation to FIG. 7, this approach may allow compensation of color non-uniformity to be achieved independently on a per-side basis, as well as binocularly between the left and right sides. To illustrate these types of implementations, FIGS. 8-10 show various configurations that each include two separate waveguides per side of augmented reality glasses devices similar to those that have been described.

Figure 8:
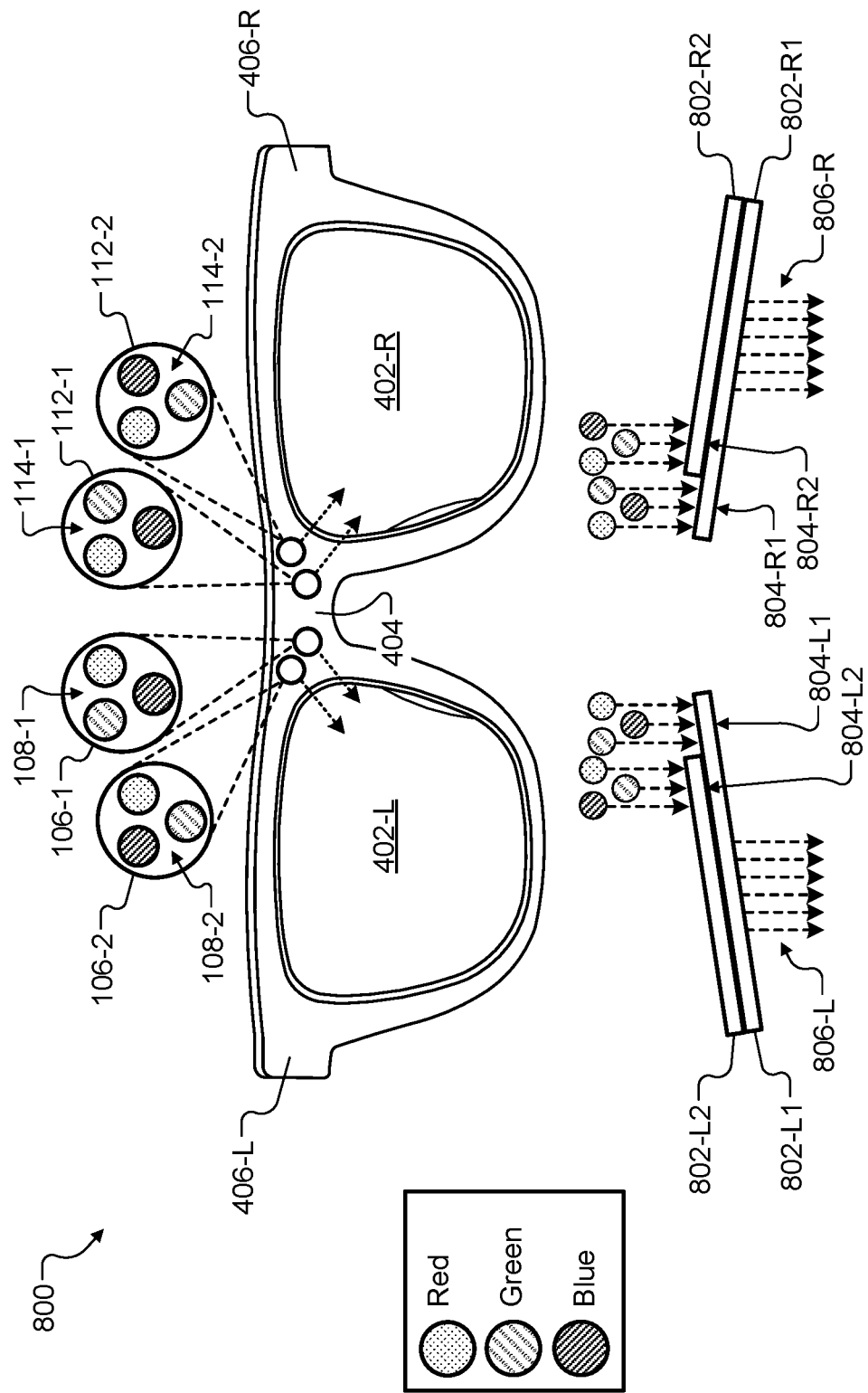

In FIG. 8, an augmented reality glasses device 800 is shown to add to the sets of monochrome pixel panels and waveguides described in previous examples. Specifically, as shown, augmented reality glasses device 800 includes a set 106-1 of monochrome pixel panels in an arrangement 108-1 (on the left side) and a set 112-1 of monochrome pixel panels in an arrangement 114-1 (on the right side). Like augmented reality glasses device 700, augmented reality glasses device 800 further includes a set 106-2 of monochrome pixel panels distributed in an arrangement 108-2 and collectively configured to produce the color image for presentation on the left side, as well as a set 112-2 of monochrome pixel panels distributed in an arrangement 114-2 and collectively configured to produce the color image for presentation on the right side. In contrast to augmented reality glasses device 700, however, augmented reality glasses device 800 is further shown to include, in addition to first and second waveguides like those shown in FIG. 7, a third waveguide parallel to the first waveguide on the left side and fourth waveguide parallel to the second waveguide on the right side. More particularly, on the left side, augmented reality glasses device 800 is shown to include, along with a waveguide 802-L1 and its set 804-L1 of separate input apertures for each monochrome pixel panel in set 106-1 of monochrome pixel panels, a waveguide 802-L2 with an additional set 804-L2 of separate input apertures for each monochrome pixel panel in set 106-2 of monochrome pixel panels. Collectively, waveguides 802-L1 and 802-L2 may be configured to guide light from respective sets 106-1 and 106-2 of monochrome pixel panels to achieve the presentation on the left side.

Similarly, on the right side, augmented reality glasses device 800 is shown to include, along with a waveguide 802-R1 and its set 804-R1 of separate input apertures for each monochrome pixel panel in set 112-1 of monochrome pixel panels, a waveguide 802-R2 with an additional set 804-R2 of separate input apertures for each monochrome pixel panel in set 112-2 of monochrome pixel panels. Collectively, waveguides 802-R1 and 802-R2 may be configured to guide light from the respective sets 112-1 and 112-2 of monochrome pixel panels to achieve the presentation on the right side.

In like manner as described above in relation to FIG. 7, various arrangements of monochrome pixel panels in augmented reality glasses device 800 may be inverted so as to mitigate color non-uniformity both on a per side and on a binocular basis. Specifically, as shown, arrangement 108-2 may be inverted from arrangement 108-1, such that mitigation of color non-uniformity described above with respect to differences on the left and right side may be achieved on the left side even when taken in isolation. Similarly, arrangement 114-2 is shown to be inverted from arrangement 114-1, such that this mitigation of color non-uniformity may likewise be achieved on the right side in isolation. Additionally, arrangements 108-1 and 114-1 are inverted from one another, as are arrangements 108-2 and 114-2. It will be understood that the same types of variations in corresponding monochrome pixel panels on a given side (e.g., a red monochrome pixel panel within set 106-1 and another red monochrome pixel panel within set 106-2) may be used in implementations such as illustrated in FIG. 8 that include multiple waveguides per side. For example, two monochrome pixel panels of the same color on one side could be implemented identically or employ variations in polarity (e.g., S-polarization versus P-polarization, etc.), frequency (e.g., a 633 nanometer red versus a 650 nanometer red, etc.), or the like.

Each of FIGS. 8-10 show example implementations of binocular head-mounted displays (e.g., augmented reality glasses devices) that have multiple waveguides per side, such as have been described in relation to FIG. 8. Each of these figures is unique, however, in where the respective sets of monochrome pixel panels are integrated within the glasses device and how the waveguides are configured so as to accommodate these differences.

Specifically, one implementation of the binocular head-mounted display is shown in FIG. 8 to be implemented by augmented reality glasses device 800 that includes: 1) the left lens 402-L into which waveguides 802-L1 and 802-L2 are integrated; 2) the right lens 402-R into which waveguides 802-R1 and 802-R2 are integrated; and 3) the frame having the bridge 404 into which sets 106-1 and 106-2 of monochrome pixel panels, as well as sets 112-1 and 112-2 of monochrome pixel panels, are integrated. As shown in FIG. 8, each waveguide may have its own set of separate input apertures to accept light input from one of the sets of monochrome pixel panels and to ultimately guide that light to be output to the user. Specifically, as illustrated in this implementation, waveguide 802-L1 includes a set 804-L1 of input apertures on the bridge side and waveguide 802-L2 includes a set 804-L2 of input apertures also on the bridge side. Similarly, waveguide 802-R1 includes a set 804-R1 of input apertures on the bridge side and waveguide 802-R2 includes a set 804-R2 of input apertures also on the bridge side. Collectively, these waveguides may guide incoming light from the monochrome pixel panels integrated within bridge 404 to be output as light 806-L on the left side and as light 806-R on the right side.

Another implementation of the binocular head-mounted display is shown in FIG. 9 to be implemented by an augmented reality glasses device 900 that includes: 1) the left lens 402-L into which waveguides 902-L1 and 902-L2 are integrated; 2) the right lens 402-R into which waveguides 902-R1 and 902-R2 are integrated; and 3) the frame having the left endpiece 406-L into which the sets 106-1 and 106-2 of monochrome pixel panels are integrated and the right endpiece 406-R into which the sets 112-1 and 112-2 of monochrome pixel panels are integrated. As described above in relation to FIG. 8, FIG. 9 again shows that each waveguide may have its own set of separate input apertures to accept light input from one of the sets of monochrome pixel panels and to ultimately guide that light to be output to the user. Specifically, as illustrated in this implementation, waveguide 902-L1 includes a set 904-L1 of input apertures on the endpiece side and waveguide 902-L2 includes a set 904-L2 of input apertures also on the endpiece side. Similarly, waveguide 902-R1 includes a set 904-R1 of input apertures on the endpiece side and waveguide 902-R2 includes a set 904-R2 of input apertures also on the endpiece side. Collectively, these waveguides may guide incoming light from the monochrome pixel panels integrated within endpieces 406-L and 406-R to be output as light 906-L on the left side and as light 906-R on the right side.

Yet another implementation of the binocular head-mounted display is shown in FIG. 10 to be implemented by an augmented reality glasses device 1000 that includes: 1) the left lens 402-L into which waveguides 1002-L1 and 1002-L2 are integrated; 2) the right lens 402-R into which waveguides 1002-R1 and 1002-R2 are integrated; and 3) the frame having the bridge 404 into which the set 106-1 of monochrome pixel panels and the set 112-1 of monochrome pixel panels is integrated, the left endpiece 406-L into which the set 106-2 of monochrome pixel panels is integrated, and the right endpiece 406-R into which the set 112-2 of monochrome pixel panels is integrated. As described above in relation to FIGS. 8 and 9, FIG. 10 again shows that each waveguide may have its own set of separate input apertures to accept light input from one of the sets of monochrome pixel panels and to ultimately guide that light to be output to the user. Specifically, as illustrated in this implementation, waveguide 1002-L1 includes a set 1004-L1 of input apertures on the bridge side and waveguide 1002-L2 includes a set 1004-L2 of input apertures on the endpiece side. Similarly, waveguide 1002-R1 includes a set 1004-R1 of input apertures on the bridge side and waveguide 1002-R2 includes a set 1004-R2 of input apertures on the endpiece side. Collectively, these waveguides may guide incoming light from the monochrome pixel panels integrated within bridge 404 and endpieces 406-L and 406-R to be output as light 1006-L on the left side and as light 1006-R on the right side.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A number of implementations have been described. Nevertheless, it will be understood that various modifications may be made without departing from the spirit and scope of the description and claims. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein, the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents may occur to those skilled in the art. It is therefore to be understood that the appended claims are intended to cover such modifications and changes as fall within the scope of the implementations. It will be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described. As such, the scope of the present disclosure is not limited to the particular combinations hereafter claimed, but instead extends to encompass any combination of features or example implementations described herein irrespective of whether or not that particular combination has been specifically enumerated in the accompanying claims at this time.

What is claimed is:

1. An extended reality projection system comprising:
   a binocular head-mounted display having a left side and a right side;
   a first set of monochrome pixel panels distributed in a first arrangement and collectively configured to produce a color image for presentation on the left side; and
   a second set of monochrome pixel panels distributed in a second arrangement and collectively configured to produce the color image for presentation on the right side, the second arrangement being inverted from the first arrangement such that a color non-uniformity associated with the presentation on the right side is inverted from a color non-uniformity associated with the presentation on the left side.

2. The extended reality projection system of claim 1, wherein:
   the first set of monochrome pixel panels includes a first red pixel panel, a first green pixel panel, and a first blue pixel panel; and
   the second set of monochrome pixel panels includes a second red pixel panel, a second green pixel panel, and a second blue pixel panel.

3. The extended reality projection system of claim 1, wherein the binocular head-mounted display is implemented by an augmented reality glasses device that includes:
   a left lens and a right lens each configured to facilitate a display of the color image while allowing a passage of light from an environment; and
   a frame configured to hold the left lens and the right lens, the frame having a bridge into which the first set of monochrome pixel panels and the second set of monochrome pixel panels is integrated.

4. The extended reality projection system of claim 1, wherein the binocular head-mounted display is implemented by an augmented reality glasses device that includes:
   a left lens and a right lens each configured to facilitate a display of the color image while allowing a passage of light from an environment; and
   a frame configured to hold the left lens and the right lens, the frame having a left endpiece into which the first set of monochrome pixel panels is integrated and a right endpiece into which the second set of monochrome pixel panels is integrated.

5. The extended reality projection system of claim 1, further comprising:
   a first waveguide configured to guide light from the first set of monochrome pixel panels to achieve the presentation on the left side, the first waveguide including separate input apertures for each monochrome pixel panel in the first set of monochrome pixel panels; and
   a second waveguide configured to guide light from the second set of monochrome pixel panels to achieve the presentation on the right side, the second waveguide including separate input apertures for each monochrome pixel panel in the second set of monochrome pixel panels.

6. The extended reality projection system of claim 5, further comprising:
   a third set of monochrome pixel panels distributed in a third arrangement and collectively configured to produce the color image for presentation on the left side, the third arrangement being inverted from the first arrangement; and
   a fourth set of monochrome pixel panels distributed in a fourth arrangement and collectively configured to produce the color image for presentation on the right side, the fourth arrangement being inverted from the second arrangement;
   wherein:
   the first waveguide is further configured to guide light from the third set of monochrome pixel panels to achieve the presentation on the left side and further includes separate input apertures for each monochrome pixel panel in the third set of monochrome pixel panels; and
   the second waveguide is further configured to guide light from the fourth set of monochrome pixel panels to achieve the presentation on the right side and further includes separate input apertures for each monochrome pixel panel in the fourth set of monochrome pixel panels.

7. The extended reality projection system of claim 6, wherein the binocular head-mounted display is implemented by an augmented reality glasses device that includes a frame having:
   a bridge into which the first set of monochrome pixel panels and the second set of monochrome pixel panels is integrated;
   a left endpiece into which the third set of monochrome pixel panels is integrated; and
   a right endpiece into which the fourth set of monochrome pixel panels is integrated.

8. The extended reality projection system of claim 5, further comprising:
   a third set of monochrome pixel panels distributed in a third arrangement and collectively configured to produce the color image for presentation on the left side, the third arrangement being inverted from the first arrangement;
   a third waveguide configured to guide light from the third set of monochrome pixel panels to achieve the presentation on the left side, the third waveguide including separate input apertures for each monochrome pixel panel in the third set of monochrome pixel panels;
   a fourth set of monochrome pixel panels distributed in a fourth arrangement and collectively configured to produce the color image for presentation on the right side, the fourth arrangement being inverted from the second arrangement; and
   a fourth waveguide configured to guide light from the fourth set of monochrome pixel panels to achieve the presentation on the right side, the fourth waveguide including separate input apertures for each monochrome pixel panel in the fourth set of monochrome pixel panels.

9. The extended reality projection system of claim 8, wherein the binocular head-mounted display is implemented by an augmented reality glasses device that includes:
   a left lens into which the first waveguide and the third waveguide are integrated;
   a right lens into which the second waveguide and the fourth waveguide are integrated; and
   a frame having a bridge into which the first set of monochrome pixel panels, the second set of monochrome pixel panels, the third set of monochrome pixel panels, and the fourth set of monochrome pixel panels is integrated.

10. The extended reality projection system of claim 8, wherein the binocular head-mounted display is implemented by an augmented reality glasses device that includes:
   a left lens into which the first waveguide and the third waveguide are integrated;
   a right lens into which the second waveguide and the fourth waveguide are integrated; and
   a frame having:
      a left endpiece into which the first set of monochrome pixel panels and the third set of monochrome pixel panels is integrated, and
      a right endpiece into which the second set of monochrome pixel panels and the fourth set of monochrome pixel panels is integrated.

11. The extended reality projection system of claim 8, wherein the binocular head-mounted display is implemented by an augmented reality glasses device that includes:
   a left lens into which the first waveguide and the third waveguide are integrated;
   a right lens into which the second waveguide and the fourth waveguide are integrated; and
   a frame having:
      a bridge into which the first set of monochrome pixel panels and the second set of monochrome pixel panels is integrated,
      a left endpiece into which the third set of monochrome pixel panels is integrated, and
      a right endpiece into which the fourth set of monochrome pixel panels is integrated.

12. The extended reality projection system of claim 1, wherein the first arrangement and the second arrangement are triangular arrangements.

13. The extended reality projection system of claim 1, wherein the first arrangement and the second arrangement are vertically-stacked arrangements.

14. A method comprising:
   producing, by a first set of monochrome pixel panels distributed in a first arrangement within a binocular head-mounted display, a color image for presentation on a left side of the binocular head-mounted display; and
   producing, by a second set of monochrome pixel panels distributed in a second arrangement within the binocular head-mounted display, the color image for presentation on a right side of the binocular head-mounted display;
   wherein the second arrangement is inverted from the first arrangement such that a color non-uniformity associated with the presentation on the right side is inverted from a color non-uniformity associated with the presentation on the left side.

15. The method of claim 14, wherein:
   the first set of monochrome pixel panels includes a first red pixel panel, a first green pixel panel, and a first blue pixel panel that collectively produce the color image for the presentation on the left side; and
   the second set of monochrome pixel panels includes a second red pixel panel, a second green pixel panel, and a second blue pixel panel that collectively produce the color image for the presentation on the right side.

16. The method of claim 14, wherein the binocular head-mounted display is implemented by an augmented reality glasses device that includes:
   a left lens and a right lens each configured to facilitate a display of the color image while allowing a passage of light from an environment; and
   a frame configured to hold the left lens and the right lens, the frame having a bridge into which the first set of monochrome pixel panels and the second set of monochrome pixel panels is integrated.

17. The method of claim 14, wherein the binocular head-mounted display is implemented by an augmented reality glasses device that includes:
   a left lens and a right lens each configured to facilitate a display of the color image while allowing a passage of light from an environment; and
   a frame configured to hold the left lens and the right lens, the frame having a left endpiece into which the first set of monochrome pixel panels is integrated and a right endpiece into which the second set of monochrome pixel panels is integrated.

18. An augmented reality glasses device comprising:
   a left lens associated with a left side of the augmented reality glasses device and configured to facilitate a display of a color image while allowing a passage of light from an environment;
   a right lens associated with a right side of the augmented reality glasses device and configured to facilitate the display of the color image while allowing the passage of light from the environment;
   a frame configured to hold the left lens and the right lens and including a left endpiece on the left side, a right endpiece on the right side, and a bridge between the left endpiece and the right endpiece;
   a first set of monochrome pixel panels collectively configured to produce the color image for presentation on the left side, the first set of monochrome pixel panels integrated into the frame in a first arrangement;
   a first waveguide configured to guide light from the first set of monochrome pixel panels to achieve the presentation on the left side, the first waveguide integrated into the left lens and including separate input apertures for each monochrome pixel panel in the first set of monochrome pixel panels;
   a second set of monochrome pixel panels collectively configured to produce the color image for presentation on the right side, the second set of monochrome pixel panels integrated into the frame in a second arrangement that is inverted from the first arrangement such that a color non-uniformity associated with the presentation on the right side is inverted from a color non-uniformity associated with the presentation on the left side; and
   a second waveguide configured to guide light from the second set of monochrome pixel panels to achieve the presentation on the right side, the second waveguide integrated into the right lens and including separate input apertures for each monochrome pixel panel in the second set of monochrome pixel panels.

19. The augmented reality glasses device of claim 18, wherein the first set of monochrome pixel panels and the second set of monochrome pixel panels are both integrated into the bridge of the frame.

20. The augmented reality glasses device of claim 18, wherein:
   the first set of monochrome pixel panels is integrated into the left endpiece of the frame; and the second set of monochrome pixel panels is integrated into the right endpiece of the frame.

* * * * *